Aug. 25, 1970     H. B. FISHER     3,525,398
SEALING A PERMEABLE STRATUM WITH RESIN
Filed Nov. 19, 1968
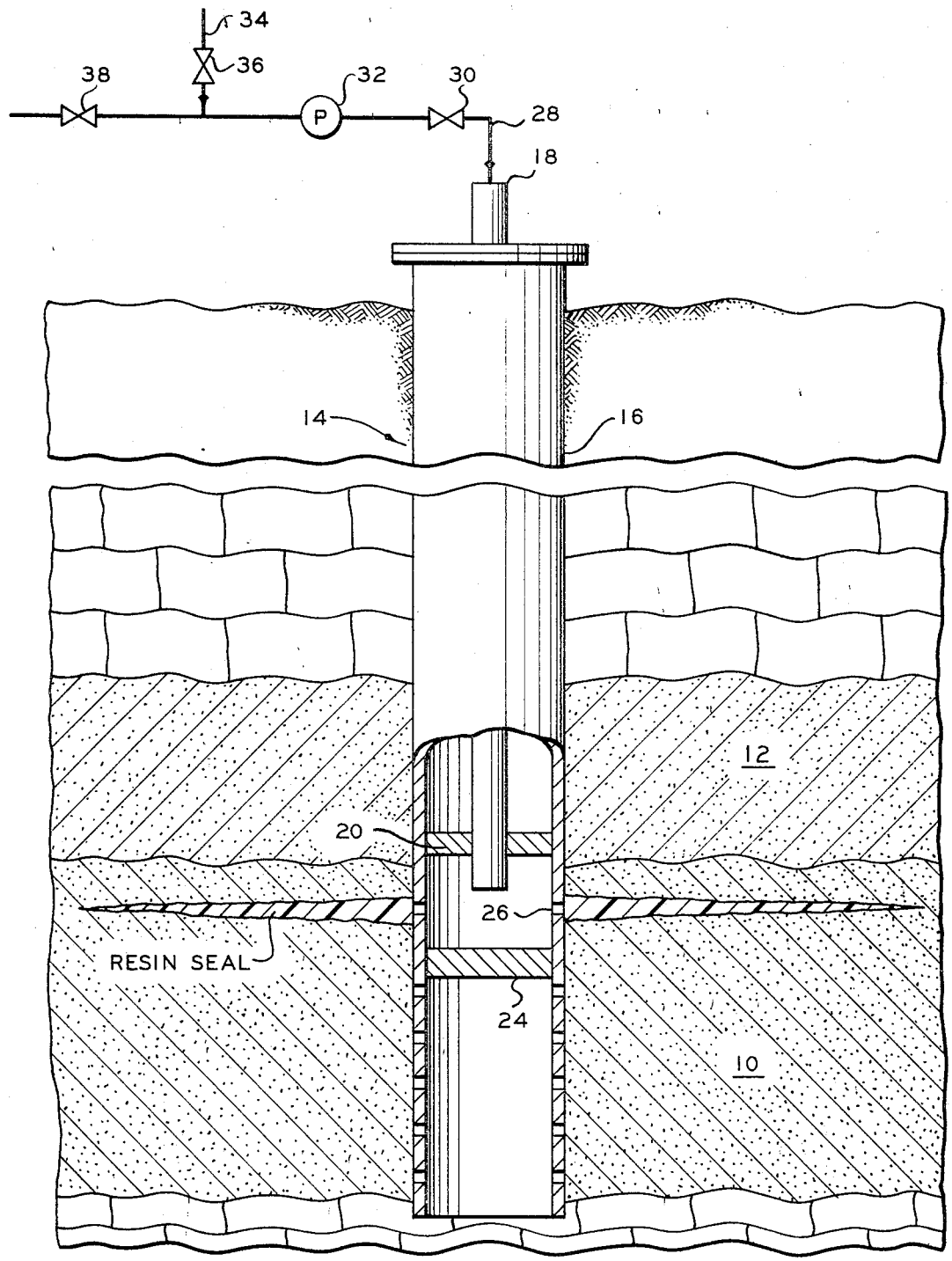
INVENTOR.
H. B. FISHER
BY Young and Quigg
ATTORNEYS

United States Patent Office 3,525,398
Patented Aug. 25, 1970

3,525,398
SEALING A PERMEABLE STRATUM WITH RESIN
Henry B. Fisher, Bartlesville, Okla., assignor to Phillips Petroleum Company, a corporation of Delaware
Continuation-in-part of application Ser. No. 503,183, Oct. 23, 1965. This application Nov. 19, 1968, Ser. No. 777,079
Int. Cl. E21b 33/138
U.S. Cl. 166—288         16 Claims

ABSTRACT OF THE DISCLOSURE

A natural or artificial fracture in a permeable formation or stratum is sealed by injecting into the fracture a stable suspension of powdered deformable solid resin in a suitable liquid inert to the resin (preferably water), and releasing the fluid pressure within the fracture to allow the stratum or formation pressure, preferably aided by formation or stratum temperature, to deform and/or fuse the particles of resin into an impermeable sheet or layer. If the stratum or formation temperature is below about 150° F., a hot fluid can be injected, if desired, to raise stratum or formation temperature in the region of the fracture to at least about 150° F. but below the melting point of the resin.

---

This application is a continuation-in-part of my copending application Ser. No. 503,183, filed Oct. 23, 1965, now abandoned.

This invention relates to a process for sealing natural or artificial fracture in a natural or man-made formation.

In one aspect this invention relates to a process for sealing natural or artificial substantially horizontal fractures in a permeable stratum or formation with an impermeable layer of thermoplastic resin.

In the production of oil from oil strata or formations, certain problems are encountered in controlling the flow of oil to the production well requiring the sealing off of a section of stratum or formation from another section of the same stratum or formation or from an adjacent stratum or formation. To illustrate, an oil stratum frequently lies subjacent a gas cap and in producing the oil from the oil stratum by steam injection, steam escapes into the gas cap and not all of the steam injected into the oil stratum is effective in producing oil. Thus, a method or means of sealing off the gas cap from the adjacent oil stratum facilitates the steam recovery process.

Another problem encountered in the production of oil is that of water or gas coning in oil strata lying just above an aquifer or a gas zone. As a production well penetrating the oil stratum is pumped to recover oil, water or gas invades the oil stratum adjacent the pump in a relatively cone shaped area so that water or gas is pumped along with the oil, thereby materially decreasing the amount of oil recovered by pumping. Other oil production problems require separation of one stratum from another by sealing means or a section of one stratum from a nearby section of the same stratum.

This invention is concerned with a method or process for isolating or sealing off one stratum from another or a section of a stratum from another section thereof.

An object of this invention is to provide a process for sealing natural or artificial fractures in a natural or man-made formation. A principal object of the invention is to provide a process for sealing off one permeable subterranean stratum from another or a section of a stratum from another section thereof. Another object is to provide a method for depositing an impervious layer of resin in a fracture in a permeable stratum. Other aspects, objects, and advantages of the invention will become apparent to one skilled in the art upon consideration of the accompanying disclosure.

Thus, broadly speaking, the invention resides in a process for sealing a fracture in a natural or man-made formation by introducing into said fracture a relatively stable liquid suspension of a finely divided, e.g., powdered deformable solid resin in an amount sufficient to substantially fill said fracture with particles of said resin, and thereafter subjecting said resin in said fracture to pressure to cause deformation of said resin particles to form an essentially impermeable seal in said fracture. One broad aspect of the invention comprises injecting minute particles of a thermoplastic resin into a generally horizontal fracture in a permeable stratum maintained open under fluid pressure so as to substantially fill the fracture with the resin particles and thereafter releasing the fluid pressure in the fracture so as to subject the resin to the overburden pressure and cause fusion of the resin particles into a solid impermeable layer or sheet. The resulting pancake layer extending radially outwardly from the injection well forms a barrier between the stratum above and the subjacent stratum.

Underground strata containing oil are usually at a temperature substantially above atmospheric and below the melting point of most thermoplastic resins. In the event the fracture to be sealed is at such a low temperature that heating of the adjacent stratum facilitates the fusion of the resin, heat may be applied to the stratum, particularly, through the fracture by means of hot fluid such as water, hydrocarbon gas or oil, steam, air, combustion gas, nitrogen, etc. The injected hot fluid is forced into the permeable stratum adjoining the fracture so that the later injected resin can fill the fracture. A stratum at a temperature in the range of about 150 to 210° F. permits the desired deformation and/or fusion of the thermoplastic resin when the formation pressure is applied thereto. With some thermoplastic resins, the temperature of the reservoir can be even higher than 210° F., e.g., 250° F., or higher.

Any finely divided, particulate, or powdered solid resin capable of being deformed and/or fused to form a continuous essentially impermeable sheet or barrier can be used in the practice of the invention. By the term "deformed" as used herein and in the claims, unless otherwise specified, is meant that when a layer of the particles of resin are sufficiently changed in shape, when subjected to pressure, particularly in a confined region such as a crevice, fracture, or void in a formation or stratum, that the boundaries of the deformed particles will overlap to form a continuous layer forming a substantially impermeable sheet or barrier. The thermoplastic resins are presently preferred for use in the practice of the invention. Particles of said thermoplastic resins will fuse when subjected to pressure, particularly when the formation temperature is sufficient to cause a softening of the resin. The resins used should be insoluble in, or at least resistant to, water or the organic liquid used as the carrying medium and also to any fluids present in the formation, e.g., crude oil.

Preferably, the particulate resin effective in the process has an average particle size not exceeding 30 microns in diameter and is preferably in the range of 8 to 30 microns. Particulate resins of this particle size have the valuable property of forming stable thixotropic suspensions as shown by the examples given hereinafter. The preferred form of the particulate resin is microspheres formed of polyolefin, particularly, polyethylene, polypropylene, and copolymers and blends thereof. Polymers of at least one 1-olefin having from 2 to 4, preferably 2 to 3, carbon atoms per molecule are preferred. Said 1-olefins may be copolymerized with each other and with other olefins such as other butenes to provide a suitable resin for use in the process. The term "polymer" is employed generically herein and in the claims, unless otherwise specified, to include both homopolymers and copolymers of said 1-olefins. The microspheres of the polyolefins are commercially available, but they may be made by various techniques such as spray drying a solution of the selected polymer in a drying ambient such as in a fluidized bed in a steam ambient or spraying the molten polymer into a cool liquid such as water.

The minute particles of the selected resin and particularly the microspheres thereof can be stably dispersed in water and organic liquids including hydrocarbon oils in concentrations as high as 50 weight percent of the solid. Concentrations within the range of about 5 to about 50, preferably about 5 to about 20, weight percent of the solid are usually used in the practice of the invention. This stable suspension is injected into a fracture, for example, around a well penetrating the porous stratum containing the fracture, under sufficient pressure to hold the fracture open so that microspheres invade the void formed by the fracture with the liquid portion of the suspension disappearing into the surrounding porous stratum, thereby leaving the fracture filled with several layers of the spheres. Release of pressure on the injected suspension, or opening the well to flow, permits the fracture to collapse on the injected spheres and form an impermeable seal by deformation and/or fusion thereof. In effect, the overburden pressure, preferably together with the heat of the formation, effects collapse of the spheres, forming essentially a continuous, impermeable, horizontal sheet or barrier between the area above the fracture and that below.

Applications of the invention to either natural or artificial fractures include shutting off water zones from oil zones, sealing gas cap from an oil zone, preventing gas or water coning, preventing zones from allowing water or miscible floods from bypassing the oil zone, sealing zones into which drilling fluids are being lost, and in similar borehole-treating applications. The invention also finds application in sealing cracks, fractures, or voids in man-made formations such as dams, breakwaters, walls, foundations, and other structures. Thus, the invention is applicable to sealing natural or artificial fractures, cracks, voids, etc., in either natural or man-made formations.

Organic liquids which can be used as the carrying or suspending medium in the practice of the invention include those which are substantially inert to the resin and the formation under the conditions of use. Included among said organic liquids are aliphatic hydrocarbons, preferably normally liquid, aromatic hydrocarbons such as benzene, toluene, and the xylenes, gasoline, kerosene, naphtha, diesel fuel, and other oils.

Laboratory tests have been conducted to show the feasibility of the invention in sealing a fracture.

The following examples illustrate the invention but are not to be construed as unnecessarily limiting the same.

Example I

To 10 grams of "Microthene FN-500" was added increments of water and the mass stirred with a rod. Microthene FN-500 is a commercial product of linear polyethylene microspheres having an average sphere size in the range of about 8–30 microns, a melt index of 22, and a specific gravity of 0.915. This material is available from U.S. Industrial Chemicals Company.

| Cc. $H_2O$ added: | Results |
|---|---|
| 40 | Viscous creamy mass, no separation. |
| 50 | Do. |
| 70 | Fluid when stirred, sets to gel, no separation. |
| 100 | Do. |
| 150 | Fluid, FN-500 creams to top portion. |

These results show that a water dispersion of Microthene FN-500 forms a fluid system which is stable when quiescent, i.e., no separation. Stirring the last mixture (150 cc. $H_2O$) for 10 minutes in an Osterizer at high speed did not form a stable dispersion. The water loss value of each of the mixtures was sufficiently high to permit easy filter out on a permeable formation.

Example II

To determine the permeability of a layer of Microthene FN-500 which is compacted between rock layers which are permeable, approximately 1/8" thick wafers of Brea sandstone were cut from a 1¼" diameter rod. Between two of these wafers was placed 0.6 gram of Microthene FN-500 powder and the sandwich compressed in a Carver press for 30 minutes with temperature as a variable. After cooling to room temperature, the sandwiches were removed and their air permeability determined. The results are presented below:

CARVER PRESS CONDITIONS

| Test No. | Press (p.s.i.) | Temp., °F. | Perm. md. | Comment |
|---|---|---|---|---|
| 1 (blank) | | | 450 | |
| 2 | 5,000 | 80 | 120 | Loose. |
| 3 | 5,000 | 150 | 33 | Do. |
| 4 | 5,000 | 180 | 18 | Sealed together. |
| 5 | 5,000 | 210 | 3.6 | Do. |

These results show that the compacted Microthene FN-500 produces a very marked reduction in permeability. The higher temperature seals are more effective as the FN-500 becomes fused. The results suggest that a lower melt point product would be a preferred material in sealing off fractures in a reservoir with a temperature less than 200° F.

Example III

A series of stable dispersions of "Microthene FN-510" were prepared by mixing the indicated amounts of resin particles in 350 ml. of water for five minutes on a malted milk mixer. Microthene FN-510 is a commercial product of linear polyethylene microspheres having an average sphere size of less than 30 microns, a melt index of 5, and a density of 0.924. Rheological properties of said dispersions were measured on a Fann VG meter. The results of the test runs are given below in Table I.

Another series of dispersions was prepared by adding sodium carboxymethyl cellulose (CMC) to the above dispersions in the amount of 1 pound per barrel. Rheological properties of these dispersions were also measured on the Fann VG meter. The results of the test runs are also given below in Table I.

TABLE I

| Composition | 1 | 2 | 3 | 4 | 5 | 6 | 7 | 8 |
|---|---|---|---|---|---|---|---|---|
| Microthene FN-510: | | | | | | | | |
| Grams | 20 | 30 | 40 | 50 | 60 | 70 | 80 | 90 |
| Percent | 5.4 | 7.9 | 10.2 | 12.5 | 14.6 | 16.6 | 18.6 | 20.3 |
| Rheological properties: | | | | | | | | |
| Apparent viscosity, cp | 1.5 | 2.5 | 2 | 2 | 11 | 12 | 36 | 28 |
| Plastic viscosity, cp | 1 | 2 | 2 | 2 | 2 | 4 | 22 | 14 |
| Yield point, lb./100 ft.$^2$ | 1 | 1 | 0 | 0 | 18 | 16 | 27 | 28 |
| Initial gel, lb./100 ft.$^2$ | 3 | 2 | 1 | 1 | 7 | 4 | 12 | 7 |
| 10-min. gel, lb./100 ft.$^2$ | 2 | 8 | 3 | 12 | 17 | 13 | 24 | 15 |
| Above Dispersions Plus 1 lb./bbl. of sodium carboxymethyl cellulose | | | | | | | | |
| Rheological properties: | | | | | | | | |
| Apparent viscosity, cp | 11 | 13 | 17 | 19 | 23 | 26 | 20 | 21 |
| Plastic viscosity, cp | 8 | 7 | 9 | 16 | 15 | 19 | 16 | 14 |
| Yield point, lb./100 ft.$^2$ | 4 | 11 | 15 | 7 | 15 | 14 | 7 | 14 |
| Initial gel, lb./100 ft.$^2$ | 3 | 3 | 2 | 2 | 8 | 8 | 5 | 3 |
| 10-min. gel, lb./100 ft.$^2$ | 7 | 9 | 8 | 9 | 17 | 15 | 5 | 4 |

Referring to Table I, it will be noted that the suspensions or dispersions of the invention there tested definitely possess thixotropic properties. This is shown by comparing the initial gels with the 10-minute gels. Said thixotropic properties provide a number of advantages in the practice of the invention including increased stability during any periods of quiescence such as may be encountered, for example, during any unplanned shutdowns which may become necessary during placement of the resin particles in the fracture. The small size resin particles, even though having a density less than suspending medium, will not float to the top as will larger size particles. The thixotropic suspensions will also be more stable during slow pumping rates such as through large size conduits or wellbores. Said thixotropic properties will also aid in more uniformly distributing the resin particles in the fracture or other formation void in which they are to be placed, either during times when the resin suspensions are being used as the fracturing fluid or are placed in an already formed fracture, crack, or other void. Said thixotropic properties will also permit the suspensions used in the practice of the invention to be prepared hours, or even days, prior to actual use.

The water loss values of all the suspensions illustrated in Table I were sufficiently high to permit ready filtration of the suspending medium to a permeable formation. It is unusual to have resin suspensions or dispersions having the stability of those of Table I and which also have sufficiently high water loss values to permit said ready filtration.

The data in Table I wherein CMC was added to the suspension also illustrate another feature of the invention. Said CMC and other similar viscosifiers can be used to impart increased viscosity and thixotropic properties to the aqueous suspensions of the invention when desired. CMC is an abbreviation for carboxymethyl cellulose. CMHEC is an abbreviation for carboxymethyl hydroxyethyl cellulose, HEC is an abbreviation for hydroxyethyl cellulose, and CEC is an abbreviation for carboxyethyl cellulose. Said CMC, CMHEC, HEC, and CEC can be referred to generically as cellulose ethers. Said cellulose ethers can be used in amounts of about 0.5 to 10 pounds per barrel of aqueous suspension. Said cellulose ethers are well known water loss control agents for drilling fluids, cement slurries, etc. See U.S. Pats. 2,425,768; 2,985,239; 3,284,354; and 2,790,763, for example. However, they have no water loss control properties in aqueous suspensions of the invention. Said cellulose ethers, with the exception of HEC, are commonly used in the form of the alkali metal salt, e.g., sodium.

A more complete understanding of the invention may be had by reference to the accompanying schematic drawing which is a view in partial section through a stratum penetrated by a well.

Referring to the drawing, an oil stratum 10 underlying a gas stratum or cap 12 is penetrated by a well 14 which is provided with a casing 16 and a tubing string 18 extending into the strata. Packers 20 and 24 are set in casing 16 so as to pack off the wellbore at the level of perforations 26. A line 28 leads from a suitable source of fracturing fluid to tubing string 18 and is provided with a valve 30 and pumping means 32. Line 34 connects with a supply tank (not shown) containing a stable suspension of particulate resin of the required particle size.

It is feasible to fracture the stratum at a level adjacent the interface of strata 10 and 12 by injecting any suitable fracturing fluid conventional in the art by closing valve 36 and opening valve 38 in line 28, valve 30 being opened. Fracturing pressure is supplied by pumping means 32, causing the fracturing fluid to pass down tubing string 18 into the sealed off area between packers 20 and 24 from which the fluid passes through perforations 26 and applies pressure to the stratum at this level. The extreme pressure applied and the slow leakage of the fracturing fluid into the permeable stratum creates such a parting pressure in the invaded area that the overburden is lifted with the fracturing fluid rushing in and extending the fracture deeper into the formation as the pressure on the fracturing fluid is continued. After fracturing is effected, valve 38 is closed and valve 34 is opened so as to pump the suspension of particulate resin down the tubing string and into the fracture, sufficient pressure being applied by pumping means 32 to maintain the fracture is open condition and fill the fracture with several layers of the particulate resin.

It is also feasible to effect the fracturing with the stable suspension of the resin so that as the fracture is formed, it is filled with the particulate resin inserted to form the seal. In either event, the tubing 18 is opened to flow so as to reduce the pressure on the fluid in the tubing string and on the stratum, thereby allowing the pressure of the overburden to be applied to the layers of particulate resin and fuse same into a sealing layer. It is also advantageous to utilize a hot fracturing fluid, such as steam, when heating of the stratum is desired to facilitate fusion of the resin in-place.

Water coning is a problem in some oil wells, particularly where an oil stratum lies just above an aquifer. In this situation, a fracture is formed around a production well adjacent the interface of the oil stratum and the aquifer and the fracture is sealed with resin in accordance with this invention to prevent flow of water into the oil stratum around the production well.

Any thermoplastic resin having a melting point above stratum or formation temperature and being sufficiently soft or fusible in the temperature range of about 150 to 210° F. or even up to 250° F., or higher, without melting, is useful in the invention. High and low density polyethylene, polypropylene, and ethylene copolymers in the form of microspheres of 8 to 30 microns average diameter in about 50 weight percent concentration are most suitable. Ethylenevinyl acetate copolymers are also operable. Other plastics or resins which are operable in the practice of the invention include polyvinyl chloride, polyvinyl acetate, and others.

While the invention has been illustrated with particular reference to sealing substantially horizontal fractures in formations, e.g., a fracture in a formation or formations penetrated by a well, the invention is not so limited. The invention can also be employed to seal substantially vertical fractures. This is still another advantage of the thixotropic suspensions or dispersions which are used in the practice of the invention.

Certain modifications of the invention will become apparent to those skilled in the art and the illustrative details disclosed are not to be construed as imposing unnecessary limitations on the invention.

I claim:

1. A process for sealing a fracture in a permeable formation, said fracture being subject to formation pressure but capable of being forced open by application of fluid pressure thereto, which process comprises: introducing into said fracture, while it is being held open by application of fluid pressure thereto, an amount of a relatively stable thixotropic liquid suspension of a particulate deformable solid resin which is sufficient to substantially fill said fracture with particles of said resin; and releasing said fluid pressure so as to subject said resin in said fracture to stratum pressure, thereby causing deformation of said resin particles to form a substantially impermeable barrier in said fracture.

2. A process in accordance with claim 1 wherein said resin is a polymer of a 1-olefin containing from 2 to 4 carbon atoms per molecule.

3. A process in accordance with claim 2 wherein said resin is a polymer of ethylene.

4. A process in accordance with claim 3 wherein: said resin is polyethylene; and said suspension also contains sodium carboxymethyl cellulose in an amount sufficient to improve said thixotropic properties.

5. A process for sealing a fracture in a permeable formation, said fracture being subject to formation pressure but capable of being forced open by application of fluid pressure thereto, which process comprises: introducing into said fracture, while it is being held open by application of fluid pressure thereto, a relatively stable thixotropic liquid suspension of a particulate deformable solid resin having an average particle size up to about 30 microns in an amount which is sufficient to substantially fill said fracture with particles of said resin; and releasing said fluid pressure so as to subject said resin in said fracture to formation pressure, thereby causing deformation of said resin particles to form a substantially impermeable barrier in said fracture.

6. A process in accordance with claim 5 wherein said resin is a polymer of a 1-olefin containing from 2 to 4 carbon atoms per molecule.

7. A process in accordance with claim 6 wherein said resin is a polymer of ethylene and is present in said suspension in an amount within the range of from about 5 to about 50 weight percent.

8. A process in accordance with claim 7 wherein said resin is polyethylene and is present in said suspension in an amount within the range of from about 5 to about 20 weight percent.

9. A process for sealing a fracture in a permeable stratum, said stratum being at a temperature below the softening point of a resin sealing material mentioned hereinafter, and said fracture being subject to stratum pressure but capable of being forced open by application of fluid pressure thereto, which process comprises: injecting a heating fluid into said fracture to heat same and the adjacent stratum to a temperature of at least about 150° F. but below the melting point of said resin; introducing into said heated fracture, while it is being held open by application of fluid pressure thereto, an amount of a relatively stable thixotropic liquid suspension of a particulate deformable solid resin which is sufficient to substantially fill said fracture with particles of said resin; and releasing said fluid pressure so as to subject said resin in said fracture to stratum pressure, thereby causing deformation of said resin particles to form an essentially impermeable seal in said fracture.

10. A process for sealing off one section of a permeable oil stratum from an adjacent section of permeable stratum penetrated by a well, said stratum being at a temperature of at least about 150° F. but below the melting point of the resin of step (2), which process comprises the steps of:
(1) injecting a fracturing fluid into said well and applying fracturing pressure with said fluid at a selected level intermediate said sections so as to form a generally horizontal fracture therein extending radially from said well;
(2) forming a relatively stable thixotropic suspension of particulate deformable solid resin in a liquid inert thereto, the average particle size of said resin not exceeding about 30 microns;
(3) forcing said suspension through said well into said fracture while said fracture is forced open by fluid pressure so as to substantially fill said fracture with said particulate resin; and
(4) releasing fluid pressure in said fracture following step (3) so as to subject said resin within said fracture to stratum pressure, thereby causing fusion of said particles of resin to form a continuous sealing layer thereof within said fracture.

11. The process of claim 10 wherein said oil stratum lies adjacent a gas cap and said fracture is formed at a level adjacent the interface of said gas cap with said oil stratum.

12. The process of claim 10 wherein said oil stratum lies just above an aquifer, said well is an oil producing well, water coning is a problem, and said fracture is formed adjacent the interface of said oil stratum with said aquifer to reduce coning.

13. The process of claim 10 wherein said resin is a polymer of ethylene.

14. A process for sealing off one section of a permeable stratum from another section of permeable stratum, each section being penetrated by a well and being at a temperature below about 150° F., which process comprises the steps of:
(1) forming a horizontal fracture intermediate said sections extending radially from said well by injecting steam through said well at a pressure sufficient to create said fracture;
(2) said steam serving to heat the adjacent stratum to a temperature of at least about 150° F. but below the melting point of the resin of step (3);
(3) forming a relatively stable thixotropic aqueous suspension of particulate deformable solid resin, the average particle size of asid resin not exceeding about 30 microns and the concentration thereof being in the range of about 5 to 50 weight percent of the suspension;
(4) forcing said suspension through said well into said fracture while said fracture is forced open by fluid pressure and said adjacent stratum is heated to a temperature above 150° F. so as to substantially fill said fracture with said particulate resin; and
(5) releasing fluid pressure in said fracture following step (4) so as to subject said resin within said fracture to stratum pressure, thereby causing fusion of said particles of resin to form a continuous sealing layer thereof within said fracture.

15. The process of claim 14 wherein said resin is a polyolefin formed principally of at least one 1-olefin of 2 to 4 carbon atoms.

16. The process of claim 14 wherein said resin is polyethylene and is present in said suspension in a concentration within the range of about 5 to about 20 weight percent.

References Cited

UNITED STATES PATENTS

| | | | |
|---|---|---|---|
| 2,787,325 | 4/1957 | Holbrook | 166—33 X |
| 2,799,341 | 7/1957 | Maly | 166—33 X |
| 3,149,673 | 9/1964 | Pennington. | |
| 3,153,450 | 10/1964 | Foster et al. | |
| 3,172,470 | 3/1965 | Huitt et al. | |
| 3,223,163 | 12/1965 | Koch et al. | 166—33 |
| 3,228,470 | 1/1966 | Papaila | 166—29 |
| 3,233,673 | 2/1966 | Spain et al. | |
| 3,237,690 | 3/1966 | Karp et al. | 166—33 X |
| 3,281,354 | 10/1966 | Scott et al. | |
| 3,297,088 | 1/1967 | Huitt et al. | 166—33 |

FOREIGN PATENTS 571,519   3/1959   Canada.

CHARLES E. O'CONNELL, Primary Examiner

I. A. CALVERT, Assistant Examiner

U.S. Cl. X.R.

166—295, 308